United States Patent [19]

Demmler et al.

[11] 4,110,278

[45] Aug. 29, 1978

[54] MANUFACTURE OF MOLDING COMPOSITIONS BASED ON UNSATURATED POLYESTER RESINS

[75] Inventors: Kurt Demmler, Ludwigshafen; Horst Lawonn, Limburgerhof; Anton Hesse, Ludwigshafen, all of Fed. Rep. of Germany

[73] Assignee: BASF Aktiengesellschaft, Ludwigshafen, Fed. Rep. of Germany

[21] Appl. No.: 631,195

[22] Filed: Nov. 11, 1975

[30] Foreign Application Priority Data

Nov. 19, 1974 [DE] Fed. Rep. of Germany ....... 2454773

[51] Int. Cl.² .................... C08K 3/28; C08L 1/00; C08L 67/06

[52] U.S. Cl. .................. 260/17 A; 260/40 R; 260/42.53; 260/863; 260/864; 260/865; 260/866; 260/873

[58] Field of Search ................. 260/75, 863, 864, 865, 260/866, 867, 40 R, 42.18, 42.44, 42.53, 17 R, 17 A

[56] References Cited

U.S. PATENT DOCUMENTS

| 3,028,360 | 4/1962 | Brooks et al. | 260/864 |
| 3,795,717 | 3/1974 | Vargin et al. | 260/865 |

Primary Examiner—J. Ziegler
Attorney, Agent, or Firm—Keil, Thompson & Shurtleff

[57] ABSTRACT

Curable unsaturated quick-thickening polyester resin molding compositions are obtained by adding special onium salts as thickening accelerators to unsaturated polyester resins.

5 Claims, No Drawings

MANUFACTURE OF MOLDING COMPOSITIONS BASED ON UNSATURATED POLYESTER RESINS

The present invention relates to a process for the manufacture of polyester resin molding compositions from a mixture of unsaturated polyester, a copolymerizable olefinic compound, an alkaline earth metal oxide or hydroxide, an inhibitor and, optionally, further additives, together with special substances which act as thickening accelerators.

Molding and pressing compositions of unsaturated polyester resins conventionally contain unsaturated polyesters and monomeric vinyl compounds copolymerizable therewith, polymerization initiators and inhibitors and, frequently, pulverulent fillers and glass fibers or webs of glass fiber structures. Curable molding compositions of low shrinkage furthermore contain up to 30% by weight of thermoplastic polymers. To obtain non-tacky products with optimum rheological properties under the requisite curing conditions, small amounts of finely particulate alkaline earth metal oxide are admixed with the polyester molding compositions before the latter are mixed with fillers. This results in thickening due to salification of the carboxyl end groups of the unsaturated polyester, and due to complex formation.

The ripening process which is often lengthy and may require weeks, or at least several days, at room temperature, however stands in the way of an economical and rapid method of processing, since it entails the disadvantage of keeping substantial stocks if moldings are to be produced continuously. This method is particularly unsuitable, for both economic and technical reasons, when long runs of moldings are to be manufactured directly, using a conveyor belt arrangement, from unsaturated polyester resin via the thickened molding composition (prepreg). This would require the thickening process to give a usable degree of ripening in a few minutes if economical belt speeds are employed.

It is an object of the present invention to provide a more economical process for the manufacture of molding compositions based on unsaturated polyester resins, in which the thickening by means of alkaline earth metal oxides or hydroxides takes place substantially more rapidly. In developing such a process it was necessary to bear in mind that it is only possible to use thickening accelerators which are soluble in the unsaturated polyester resin, do not reduce the shelf life of the latter and do not show any change, on storage, of their high effectiveness as resin thickeners. When thickening accelerators such as PCl$_3$, POCl$_3$ or HCl are used, their effectiveness as resin thickeners shows a marked drop after as little as one day and therefore these additives can only be introduced shortly before the unsaturated polyester resin molding compositions are processed.

We have found, surprisingly, that the above object is achieved by adding organic "onium salts" containing ionic halogen or thiocyanate and cationic centers of quaternary nitrogen, phosphorus, arsenic or antimony or ternary oxygen, sulfur or selenium. Such onium salts have previously only been disclosed as polymerization accelerators for the block polymerization of organic compounds (German Patent 1,049,581), but nothing was known of their use in, and effect on, unsaturated polyester resin molding compositions which contain an alkaline earth metal oxide or hydroxide.

The present invention relates to a process for the manufacture of unsaturated polyester resin molding compositions which can be cured in the presence of conventional polymerization initiators and which consist of a mixture of (a) one or more unsaturated polyesters,
(b) one or more copolymerizable olefinic compounds,
(c) an alkaline earth metal oxide and/or hydroxide,
(d) one or more inhibitors and, if appropriate,
(e) conventional fillers, reinforcing agents, inert solvents, polymerization accelerators, shrinkage-reducing additives and/or other assistants conventionally employed when using polyester molding compositions, in which process from 0.1 to 2% by weight, based on unsaturated polyester resin (a) + (b), of one or more onium salts of the general formula

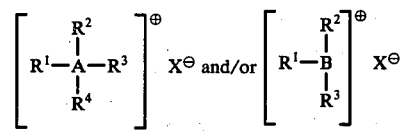

wherein A is nitrogen, phosphorus, arsenic or antimony and B is oxygen, sulfur or selenium, $R^1$, $R^2$, $R^3$ and $R^4$, which may be identical or different, are hydrogen, unsubstituted or substituted alkyl or aryl, but at least one of $R^1$ to $R^4$ unsubstituted or substituted alkyl or aryl or two of $R^1$ to $R^4$ are linked to form a heterocyclic ring which contains from 5 to 7 ring members and is unsubstituted or substituted, and $X^\ominus$ is $F^\ominus$, $Cl^\ominus$, $Br^\ominus$, $I^\ominus$ or $SCN^\ominus$, or such onium salt groupings are built into a polymer molecule via one of $R^1$ to $R^4$, are added to one or more of the starting components (a) to (e).

In an advantageous embodiment of the process of the invention, from 1 to 30% by weight, based on unsaturated polyester resin (a) + (b), of a thermoplastic polymer are added to the polyester molding compositions, and/or the onium salts used are substances containing two or more identical or different onium salt groupings per molecule.

The process of the invention has a number of substantial advantages over conventional processes. The unsaturated polyester resin molding compositions containing the alkaline earth metal oxide or hydroxide thicken more rapidly, and the thickening characteristics do not suffer significantly on storage of the polyester resins used to manufacture the molding compositions. At slightly elevated temperatures, the ripening, to give a molding composition which can be press-molded, requires only a few minutes. This avoids complex stockholding of semi-finished goods, so that optimum preparation of the molding compositions, and immediate further processing of these — say on a conveyor-belt principle — to give moldings, is realizable.

Regarding the components (a) to (e), used to prepare the mixture for the process of the invention, the following should be noted:

(a) Suitable unsaturated polyesters are the conventional polycondensation products of polybasic, especially dibasic, carboxylic acids, and their esterifiable derivatives, linked by ester bonds to polyhydric, especially dihydric, alcohols, and optionally also containing radicals of monobasic carboxylic acids and/or radicals of monohydric alcohols and/or radicals of hydroxycarboxylic acids, with at least some of the various radicals containing ethylenic copolymerizable groups.

Suitable polyhydric, especially dihydric, optionally unsaturated alcohols are the conventional alkanediols and oxaalkane diols which in particular contain acyclic groups, cyclic groups or both, eg. ethylene glycol, 1,2-propanediol, 1,3propanediol, 1,3-butanediol, 1,4-butanediol, 1,6-hexanediol, 2,2-dimethyl-1,3-propanediol, diethylene glycol, triethylene glycol, polyethylene glycol, 1,2-cyclohexanediol, 2,2-bis-(p-hdroxycyclohexyl)-propane, neopentyl glycol, 1,4-bis-methylolcyclohexane, vinylglycol, trimethylolpropane monoallyl ether and 1,4-butanediol. Minor amounts of monohydric, trihydric or polyhydric alcohols, eg. ethylhexanol, fatty alcohols, benzyl alcohols, 1,2-di-(allyloxy)-propan-3-ol, glycerol, pentaerythritol and trimethylolpropane may be used in addition. The polyhydric, especially dihydric, alcohols are in general reacted in stoichiometric or near-stoichiometric amounts with polybasic, especially dibasic, carboxylic acids and/or their condensable derivatives.

Suitable carboxylic acids and their derivatives are dibasic olefinic, preferably $\alpha$, $\beta$-olefinic, carboxylic acids, eg. maleic acid, fumaric acid, itaconic acid, citraconic acid, methyleneglutaric acid and mesaconic acid or their esters or anhydrides. The polyesters may furthermore contain, as co-condensed units, other dibasic unsaturated and/or saturated or aromatic carboxylic acids or anhydrides which act as modifiers, eg. succinic acid, glutaric acid, $\alpha$-methylglutaric acid, adipic acid, sebacic acid, pimelic acid, o-phthalic acid, phthalic anhydride, isophthalic acid, terephthalic acid, dihydrophthalic acid, tetrahydrophthalic acid, tetrachlorophthalic acid, 3,6-endomethylene-1,2,3,6-tetrahydrophthalic acid, endomethylenetetrachlorophthalic acid or hexachloroendomethylenetetrahydrophthalic acid, as well as monobasic, tribasic and polybasic carboxylic acids, eg. ethylhexanoic acid, fatty acids, methacrylic acid, propionic acid, benzoic acid, 1,2,4-benzenetricarboxylic acid or 1,2,4,5-benzenetetracarboxylic acid.

These unsaturated polyesters are in general manufactured from their components by melt condensation or condensation under azeotropic conditions. Amorphous unsaturated polyesters as well as unsaturated polyesters which can under certain circumstances by crystallized, may be used for the process according to the invention.

In general it has proved appropriate to use unsaturated polyesters having an acid number of from 10 to 100, preferably from 25 to 60, and having a mean molecular weight of from about 800 to 4,000.

Regarding the composition of unsaturated polyesters, reference may also be made, eg., to the book by H.V. Boenig, Unsaturated Polyesters: Structure and Properties, Amsterdam, 1964. The molding compositions to be used for the process of the invention in general contain from 10 to 70% by weight, preferably from 15 to 50% by weight, based on component (a) to (e), of unsaturated polyesters (a).

(b) Copolymerizable olefinic monomeric compounds which may be used are the vinyl and allyl compounds conventionally used for the manufacture of unsaturated polyester molding compositions, eg. stryene, substituted styrenes, such as p-chlorostyrene or vinyltoluene, esters of acrylic acid and methacrylic acid with alcohols of 1 to 18 carbon atoms, eg. methyl methacrylate, butyl acrylate, ethylhexyl acrylate, hydroxypropyl acrylate, dicyclopentadienyl acrylate, butanediol diacrylate, acrylic and methacrylic acid amides, allyl esters, eg. diallyl phthalate, and vinyl esters, eg. vinyl ethylhexanoate, vinyl pivalate and the like.

Mixtures of the said olefinic monomers may also be used. The preferred components (b) are styrene, vinyltoluene, $\alpha$-methylstyrene and diallyl phthalate. The molding compositions in general contain from 5 to 60, preferably from 10 to 45, % by weight of component (b), based on the mixture of components (a) + (b).

(c) Suitable alkaline earth metal oxides are calcium oxide, calcium hydroxide, magnesium hydroxide and, preferably, magnesium oxide, and mixtures of these oxides and hydroxides. These may in part by replaced by zinc oxide.

In general, the molding compositions according to the invention contain from 0.5 to 5, preferably from 1 to 3, % by weight of component (c), based on the mixture of components (a) and (b).

(d) The inhibitors used may be the conventional compounds, eg. hydroquinone, tert.-butyl pyrocatechol, p-benzoquinone, chloranil, nitrobenzenes, eg. m-dinitrobenzene, thiodiphenylamine and salts of N-nitroso-N-cyclohexylhydroxylamine, as well as mixtures of these. The molding compositions in general contain from 0.005 to 0.2, preferably from 0.01 to 0.1, % by weight of the inhibitors, based on the components (a) and (b).

(e) Furthermore, in most cases conventional fillers and reinforcing agents as well as, where appropriate, inert solvents, polymerization accelerators and/or other assistances conventionally used when processing polyester molding compositions are added to the compositions employed for the process according to the invention.

Examples of suitable fillers are conventional pulverulent or granular inorganic or organic fillers such as chalk, kaolin, quartz powder, dolomite, baryte, metal powders, cement, talc, kieselguhr, sawdust, wood shavings, pigments and the like.

Reinforcing agents which may be used are inorganic or organic fibers or sheet-like webs produced therefrom, if appropriate by weaving, eg. webs of glass, asbestos, cellulose and synthetic organic high molecular weight polymers.

The fillers and reinforcing agents may be used in amounts of from 5 to 200% by weight, based on components (a) to (d).

Inert solvents which may optionally also be used are ketones, esters and hydrocarbons in amounts of up to 100% by weight, based on component (a). Shrinkage-reducing additives which may optionally also be used are, eg., thermoplastic polymers, such as polystyrene, styrene copolymers, polyvinyl acetate or polyacrylates or polymethacrylates, in amounts of from 1 to about 30% by weight, based on the components (a) + (b). Conventional polymerization accelerators, eg. heavy metal salts, may also be used.

According to the invention, from 0.1 to 2% by weight, preferably from 0.3 to 1% by weight, based on unsaturated polyester resin (a) + (b), of one or more onium salts of the general formula

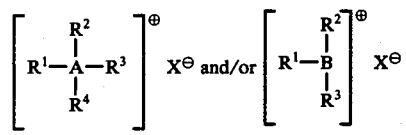

where A is nitrogen, phosphorus, arsenic or antimony and B is oxygen, sulfur or selenium, $R^1$, $R^2$, $R^3$ and $R^4$, which may be identical or different, are hydrogen, unsubstituted or substituted alkyl or aryl, but at least one of $R^1$ to $R^4$ unsubstituted or substituted alkyl or aryl or two of $R^1$ to $R^4$ are linked to form a heterocyclic ring which contains from 5 to 7 ring members and is unsubstituted or substituted, and $X^\ominus$ is $F^\ominus$, $Cl^\ominus$, $Br^\ominus$, $I^\ominus$ or $SCN^\ominus$, or such onium salt groupings are built into a polymer molecule via one of $R^1$ to $R^4$, are added to one or more of the starting components (a) to (e).

Suitable alkyl substituents $R^1$ to $R^4$ are, eg. straight-chain or branched alkyl of 1 to 20 carbon atoms or cycloalkyl of 5 or 6 carbon atoms; suitable aryl substituents $R^1$ to $R^4$ are, eg., those of 6 to 10 carbon atoms, eg. phenyl, alkylpenyl or naphthyl. The alkyl and aryl groups $R^1$ to $R^4$ may carry further substituents, eg. aryl, nitro, alkoxy, cyano or carbalkoxy groups, or halogen atoms.

Examples of thickening accelerators to be used according to the invention are primary, secondary, tertiary and quaternary ammonium salts, eg. trimethyl-benzyl-ammonium halides, trimethylcyclohexyl-ammonium halides, dimethyl-dibenzyl-ammonium halides, trimethyl-ammonium halides, triethyl-methyl-ammonium halides, benzyl-dimethyl-cyclohexyl-ammonium halides, dimethyl-butyl-cyclohexyl-ammonium halides, trimethyl-dodecyl-ammonium halides and benzyl-dimethyl-dodecyl-ammonium halides. Examples of suitable phosphonium, arsonium and stibonium salts are triphenylmethyl-, tetraalkyl- and mixed alkylaryl-phosphonium halides, -arsonium halides and -stibonium halides. Phosphonium salts with two cationic centers are also very suitable, examples being 2-oxo-hexahydropyrimidine-1,3-bis-(methyltriphenyl-phosphonium) halides, urea-N,N'-bis-(methyl-tri-phenylphosphonium chloride) and 2-oxoimidazolidine-1,3-bis-(methyltriphenyl-phosphonium) halides. Examples of effective sulfonium compounds are dodecyl-dimethylsulfonium halides and benzyl-dimethylsulfonium halides.

A further category of compounds which are active for the purposes of the present invention are heterocyclic compounds such as are, eg., described in detail in H. Beyer, "Lehrbuch der Organischen Chemie", S. Hirzel Verlag Leipzig (1959), in the chapter on heterocyclic compounds on pages 488 to 575. Amongst these, effective compounds of onium structure are those in which the cationic centers A or B are present — conjugated or non-conjugated — in a ring system. The ring system, which may contain from 5 to 7 members, and preferably 5 or 6 members, may contain further hetero-atoms in addition to one or more cationic centers. Compounds with quaternary nitrogen are particularly interesting in this context. Examples are N-methyl-pyridinium halides, benzyl-pyridinium halides, N-methyl-quinolinium halides, N-methyl-isoquinolinium halides, N-benzyl-quinolinium halides, N-benzyl-isoquinolinium halides, N,N-dimethylpyrrolidinium halides and others. It is also possible for 3 substituents to be cyclized to form 2 rings.

Other onium salts are polymeric compounds containing onium salt groupings, which is achievable by polymerizing one or more copolymerizable double bonds contained in the radicals $R^1$ to $R^4$ of the above formulae, or by use of the monomeric olefinic compounds themselves. Such compounds may be used, either directly or after copolymerization with other vinyl monomers, as thickening accelerators, an example being the chloride of $\beta$-trimethylammonium-ethyl methacrylate.

The ammonium, phosphonium, arsonium and stibonium salts to be used according to the invention are prepared by conventional methods, eg. by reaction of amines or phosphines with alkyl halides (as described, eg., in Eugen Muller "Methoden der organischen Chemie", Houben-Weyl, Volume 12/1 (1963), 79 - 126, and Volume 11/2 (1958), 591 - 640).

The sulfonium salts are also prepared by conventional methods as described, eg., in "Organic Chemistry", Volume I, 2nd Edition, 867 (John Wiley and Sons, New York, 1943). Examples of suitable oxonium and sulfonium salts are triphenyl sulfonium chloride, dimethyl-dodecylsulfonium chloride, pyrylium chloride and benzopyrylium chloride. The thickening accelerators to be used according to the invention are soluble in the unsaturated polyester resin (a) + (b), at least at elevated temperatures, and accelerate the reaction of magnesium oxide or of mixtures of magnesium oxide and alkaline earth metal oxides or hydroxides, with the carboxyl groups of the polyester; in general, the addition of as little as about 0.2% by weight produces excellent results and in some cases even lower concentrations suffice. The usual range of concentration of the onium salt in the molding composition is from 0.1 to 2% by weight, preferably from 0.3 to 1% by weight, based on the unsaturated polyester resin (a) + (b).

The onium salts may be added to the molding compositions in various ways. Preferably, they are dissolved in the unsaturated polyester resin. They may be dissolved, as the pure substances, either in the melt of the polyester, which is subsequently taken up on the appropriate vinyl monomer (in most cases styrene), or, with slight heating to about 80° C, in a solution of the unsaturated polyester in, eg., styrene. It is also possible to stir concentrated alcoholic solutions of the thickening accelerators, at room temperature, into the polyester solution. In that case, the use of reactive solvents eg. hydroxypropyl acrylate, which can be built, as monomer units, into the final product is advantageous.

The mixing of the individual components (a) to (e) and the admixture of the onium salts may be effected with conventional mixing equipment, eg. a stirrred vessel or a roll mill. The molding compositions manufactured according to the invention are usually processed further by press-molding in polished or hard-chromed steel molds, eg. under the following conditions:

pressure approx.: 2 - 20 $N_2$/mm
temperature approx.: 130° - 160° C
press dwell time approx.: 0.5 - 5 minutes.

The polyester molding compositions may be used for the manufacture of prepregs, compression molding materials and the like.

In the Examples, parts and percentages are by weight.

UNSATURATED POLYESTER RESINS

Resin A is a 65% strength solution, in styrene, of an unsaturated polyester of maleic acid and 1,2-propylene glycol in the molar ratio of 1:1.1, the solution being stabilized with 0.01% of hydroquinone. The resin has an acid number of 18.

Resin B is a 60% strength solution, in styrene, of an unsaturated polyester of maleic acid, terephthalic acid and 1,2-propylene propylene glycol in the molar ratio of 1:1:2.1, is stabiized with a combination of 0.01% of hyroquinone and 0.01% of trimethylhydroquinone and has an acid number of 12.

Resin C is a 70 % strength solution, in styrene, of an unsaturated polyester of maleic acid, o-phthalic acid, 1,3-butanediol and 1,2-propylene glycol in the molar ratio of 1:0.3:1:0.5, the solution being stabilized with 0.015% of hydroquinone. The resin has an acid number of 19.

Resin D is a 66% strength solution, in styrene, of an unsaturated polyester of maleic acid, o-phthalic acid and 1,2-propylene glycol in the molar ratio of 2:1:3.15, the solution being stabilized with 0.01% of hydroquinone. The acid number of the unsaturated polyester is 50.

EXAMPLE 1

To examine the influence of onium salts on the thickening of unsaturated polyester resins with magnesium oxide, 0.5% strength solutions of various onium salts in the unsaturated polyester resins were treated with 1.5% of magnesium oxide at 100° C in a torque-measuring rheometer[1]. 70 g samples were used and treated at 130 rpm, using the MB 50 kneading head.

[1] Plasti Corder PL-V 151 of Brabender

The scale readings recorded in the plastogram are a measure of the viscosity of the sample reached after a certain period of kneading, ie. the higher the viscosity, the larger the scale reading.

Resins A to D were tested with various onium salts under otherwise identical conditions. The results are summarized in Tables 1 to 4.

TABLE 1

Thickening of resin A with magnesium oxide and various onium salts

| Onium salt | Viscosity [scale readings] | Kneading time [mins] |
|---|---|---|
| — | 30 | 30 |
| Benzyltrimethylammonium chloride | 5,000 | 30 |
| 2-Oxohexahydropyrimidine-1,3-bis-(methyl-triphenyl-phosphonium chloride) | 4,750 | 30 |
| Chloride of β-trimethylammonium-ethyl methacrylate | 5.000 | 27 |

TABLE 2

Thickening of resin B with magnesium oxide and various ammonium salts: kneading time 30 minutes.

| Ammonium salt | Viscosity [scale readings] |
|---|---|
| — | 0 |
| Dimethyldibenzylammonium chloride | 3,250 |
| N-Benzylpyridinium chloride | 4,200 |
| Benzyltrimethylammonium chloride | 3,500 |
| Chloride of β-trimethylammonium-ethyl methacrylate | 3,750 |

TABLE 3

Thickening of resin C with magnesium oxide and various onium salts

| Onium salt | Scale readings | Kneading time [mins] |
|---|---|---|
| — | 80 | 30 |
| Dimethyldibenzylammonium chloride | 5,000 | 17 |
| N-Benzylpyridinium chloride | 5,000 | 11 |
| Benzyltrimethylammonium chloride | 5,000 | 16 |
| Chloride of β-trimethylammonium-ethyl methacrylate | 5,000 | 11 |
| 2-Oxo-imidazolidine-1,3-bis-(methyl-triphenyl-phosphonium bromide | 3,100 | 30 |

TABLE 4

Thickening of resin D with magnesium oxide and quaternary ammonium halides (kneading time 30 minutes)

| Ammonium salt | Viscosity [scale readings] |
|---|---|
| — | 310 |
| Trimethylcyclohexylammonium chloride | 3,800 |
| Trimethylcyclohexylammonium bromide | 2,100 |
| Trimethylcyclohexylammonium iodide | 800 |

EXAMPLE 2

The following unsaturated polyester resin/filler mixtures were prepared using a high speed stirrer (about 1,000 rpm):

Mixture I 100 parts of resin C
100 parts of Microdol (= dolomite) filler
5 parts of Ca stearate
2.5 parts of tert.-butyl perbenzoate (50% strength)
1 part of magnesium oxide Further mixtures only differ from I in that 0.5% of the following onium salts was respectively dissolved in resin C:

II Urea-N,N'-bis(methyl-triphenyl-phosphonium chloride)
III Dimethyldibenzylammonium chloride
IV Chloride of β-trimethylammonium-ethyl methacrylate
V Trimethylcyclohexylammonium chloride A portion of mixtures I to V, as a 2 mm thick layer between covering films, is kept for 8 minutes at 80° C and after rapid cooling the viscosity at 23° C is determined. The results are shown in Table 5.

The remainder of the mixtures I to V was used in each case to impregnate a layer of glass mat (450 g/m$^2$) which was then kept between covering films for 8 minutes at 80° C. The glass content of the mixture was about 23%. After rapid cooling to room temperature, the degree of ripening and the surface tack of the prepregs after removing the covering film were assessed (see Table 5).

When pressed in a dish-shaped steel mold, the prepregs obtained from mixtures II to V gave moldings with good surface characteristics (pressing conditions: 5 minutes at 145° C and 7.45 N/mm$^2$).

TABLE 5

Rapid ripening of mixtures I to V, with and without glass mat (8 minutes at 80° C)

| | without glass | with glass | |
|---|---|---|---|
| Mixture | Viscosity at 23° C [mPas] | degree of ripening | tack of the prepreg |
| I | 2.1 × 10$^5$ a) | insufficient | very tacky |
| II | 3.0 × 10$^6$ b) | good | dry |
| III | 1.2 × 10$^7$ b) | good | dry |
| IV | 2.2 × 10$^7$ b) | good | dry |
| V | 3.0 × 10$^7$ b) | good | dry | a) measured with a rotating-cylinder viscometer
b) measured with a Konsistometer of Haake, Berlin

EXAMPLE 3

The following mixtures were prepared using a high-speed stirrer (about 1,000 rpm):
I
100 parts of resin D
100 parts of Microdol filler
5 parts of Ca stearate
2.5 parts of tert.-butyl perbenzoate (50% strength)
1 part of magnesium oxide.

II The composition corresponds to mixture I, except that 0.5% of trimethylcyclohexylammonium chloride was added to the resin D.

III The composition corresponds to mixture I, except that 0.5% of benzyldimethylcyclohexylammonium chloride was added to the resin D.

A portion of mixtures I, II and III is ripened analogously to Example 2, as a 2 mm thick layer between covering films, for 8 minutes at 80° C, and the viscosity is determined after rapid cooling to room temperature. The values measured are summarized in Table 6.

The remainder of the mixtures I, II and III was used in each case to impregnate a layer of glass mat (450 g/m²) which was then kept between covering films for 8 minutes at 80° C (glass content 23%). After cooling to room temperature, it was not possible to pull the covering films off prepregs II and III, whilst prepreg I was very tacky and did not exhibit the degree of ripening required for press-molding. In contrast, it was possible to process the prepregs from mixtures II and III in a dish-shaped press mold (5 minutes at 145° C and 7.45 N/mm²) to give moldings having a good surface.

The experimental results are summarized in Table 6

TABLE 6

Rapid ripening of mixtures I, II and III with and without glass (8 minutes at 80° C)

| Mixture | without glass Viscosity at 23° C [mPas] | with glass Degree of ripening | with glass tack of the prepreg |
|---|---|---|---|
| I | 1.0 × 10⁵ a) | unsatisfactory | very tacky |
| II | 2.5 × 10⁷ b) | good | dry |
| III | 2.4 × 10⁷ b) | good | dry | a) measured with a rotating-cylinder viscometer
b) measured with a Konsistometer of Haake, Berlin

EXAMPLE 4

The following mixture is prepared using a high-speed stirrer (100 rpm):

I
100 parts of resin D containing 0.5% of trimethylcyclohexylammonium chloride
100 parts of dolomite filler
11 parts of TiO₂ (rutile)
11 parts of polyethylene powder
6 parts of Ca stearate
6 parts of styrene
1.2 parts of magnesium oxide II The composition is as for I, but without quaternary ammonium salt in resin D.

Both mixtures were kept in a closed vessel at 23° C and the variation of viscosity with time was followed. The values measured are listed in Table 7.

TABLE 7

Thickening of resin mixtures I and II at 23° C

| Time [hrs] | Viscosity at 23° C [mPas] Mixture I | Mixture II |
|---|---|---|
| 0 | 1.92 × 10⁴ | 1.92 × 10⁴ |
| 1 | 3.4 × 10⁴ | 2.6 × 10⁴ |
| 3 | 4.0 × 10⁵ | 3.9 × 10⁴ |
| 5 | 1.0 × 10⁶ | 8.5 × 10⁴ |

EXAMPLE 5

0.5% strength solutions of various guaternary ammonium salts in resin B are stirred with 2% of magnesium oxide and the mixtures are kept in closed vessels at 23° C. The viscosity is determined after 4 hours, using the Konsistometer of Haake, Berlin. The results are summarized in Table 8.

TABLE 8

| Ammonium salt | Viscosity [mPas] after 0 hr | after 4 hrs |
|---|---|---|
| — | 1,200 | 1,320 a) |
| Dibenzyldimethylammonium chloride | 1,260 | 3.6 × 10⁶ b) |
| N-Benzylpyridinium chloride | 1,500 | 1.26 × 10⁷ b) |
| Trimethylcyclohexylammonium chloride | 1,510 | 1.23 × 10⁷ b) |
| N-Benzyldimethylcyclohexylammonium chloride | 1,380 | 2.1 × 10⁶ b) |
| Chloride of β-trimethylammoniumethyl methacrylate | 1,360 | 1.13 × 10⁷ b) | a) measured with a rotating-cylinder viscometer
b) measured with a Konsistometer of Haake, Berlin

EXAMPLE 6

To test the effectiveness of a polymer with several cationic centers in the molecule, mixtures of
100 parts of resin A
100 parts of chalk filler (Omya BLR 2)
1.5 parts of magnesium oxide
were stored, firstly with 2% (based on resin A) of a copolymer of 10% of acrylamide and 90% of the chloride of trimethylammoniumethyl methacrylate, and, secondly, without this additive, for 90 minutes at 80° C. Whilst, after storage, the mixture without the copolymer was still very tacky at room temperature (viscosity at 23° C: 5.0 × 10⁵ mPas), the mixture with this additive was dry (viscosity at 23° C: 2.3 × 10⁷ mPas).

We claim:
1. In an unsaturated polyester molding composition which is curable in the presence of polymerization initiators and which composition includes a mixture of
    (a) an unsaturated polyester,
    (b) at least one copolymerizable olefinic monomeric compound,
    (c) an alkaline earth metal oxide or hydroxide selected from the group consisting of calcium oxide, calcium hydroxide, magnesium oxide, magnesium hydroxide and mixtures thereof, and an
    (d) inhibitor selected from the group consisting of hydroquinone, tert.-butyl pyrocatechol, p-benzoquinone, chloranil, nitrobenzenes, thiodiphenylamine, salts of N-nitroso-N-cyclohexylhydroxylamine and mixtures thereof;
the improvements comprising a composition wherein the content of component (c) is from 0.5 to 5 percent by weight based on the mixture of components (a) and (b), and said composition contains from 0.1 to 2 percent by weight, based on the mixture of components (a) and (b) of an onium salt selected from the group consisting of the formula

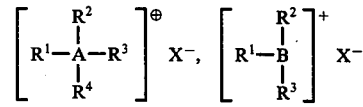

and mixtures thereof where A is selected from the group consisting of nitrogen, phosphorus, arsenic and antiomony; B is selected from the group consisting of oxygen, sulfur and selenium; $R^1$, $R^2$, $R^3$ and $R^4$ are, each independently, selected from the group consisting of hydrogen, unsubstituted alkyl, unsubstituted aryl, substituted alkyl and substituted aryl, wherein at least one of $R^1$ to $R^4$ is selected from the group consisting of unsubstituted alkyl, unsubstituted aryl, substituted alkyl and substituted aryl; two of $R^1$ to $R^4$ are linked to form a heterocyclic ring which contains from 5 to 7 ring members which are unsubstituted or substituted; $X^-$ is selected from the group consisting of $F\ominus$, $Cl\ominus$, $Br\ominus$, $I\ominus$ and $SCN\ominus$; or such onium salt groups are built into a polymer molecule via one of $R^1$ to $R^4$.

2. A composition as set forth in claim 1, wherein the onium salts used are substances which contain two or more identical or different onium salt groupings per molecule.

3. A molding composition as set forth in claim 1 wherein said $R^1$ to $R^4$ substituents are selected from a group consisting of straight-chain or branched alkyl of 1 to 20 carbon atoms, cycloalkyl of 5 to 6 carbon atoms, phenyl, alkylphenyl and naphthyl.

4. In an unsaturated polyester molding composition curable in the presence of polymerization initiators, which composition is based on a mixture of
(a) an unsaturated polyester,
(b) at least one copolymerizable olefinic monomeric compound,
(c) an alkaline earth metal oxide or hydroxide selected from the group consisting of calcium oxide, calcium hydroxide, magnesium oxide, magnesium hydroxide and mixtures thereof,
(d) inhibitors selected from the group consisting of hydroquinone, tert.-butyl pyrocatechol, p-benzoquinone, chloranil, nitrobenzenes, thiodiphenylamine, salts of N-nitroso-N-cyclohexylhydroxylamine and mixtures thereof, and optionally
(e) fillers selected from the group consisting of pulverulent or granular chalk, kaolin, quartz powder, dolomite baryte, metal powders, cement, talc, kieselgur, sawdust, wood shavings, pigments and mixtures thereof;
reinforcing agents selected from the group consisting of fibers or sheetlike webs made of glass, asbestos, cellulose and synthetic organic high molecular weight polymers inert solvents selected from the group consisting of ketones, esters and hydrocarbons, polymerization accelerators, shrinkage-reducing additives selected from the group consisting of polystyrene, styrene copolymers, polyvinylacetate, polyacrylates, polymethacrylates and other assistants wherein the improvement comprises a composition wherein the content of component (c) is from 0.5 to 5 percent by weight based on the mixture of components (a) and (b), and said composition contains from 0.1 to 2 percent by weight, based on the mixture of components (a) and (b) of an onium salt selected from the group consisting of the formula

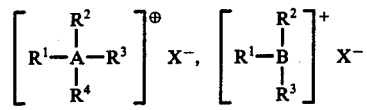

and mixtures thereof where A is selected from the group consisting of nitrogen, phosphorus, arsenic and antimony; B is selected from the gorup consisting of oxygen, sulfur and selenium; $R^1$, $R^2$, $R^3$ and $R^4$ are, each independently, selected from the group consisting of hydrogen, unsubstituted alkyl, unsubstituted aryl, substituted alkyl and substituted aryl, wherein at least one of $R^1$ to $R^4$ is selected from the group consisting of unsubstituted alkyl, unsubstituted aryl, substituted alkyl and substituted aryl; two of $R^1$ to $R^4$ are linked to form a heterocyclic ring which contains from 5 to 7 ring members which are unsubstituted or substituted; $X^-$ is selected from the group consisting of $F\ominus$, $Cl\ominus$, $Br\ominus$, $I\ominus$ and $SCN\ominus$; or such onium salt groups are built into a polymer molecule via one of $R^1$ to $R^4$.

5. A composition as set forth in claim 4 wherein from 1 to 30% by weight, based on the total combined weight of components (a) and (b) is the shrinkage-reducing additive.

* * * * *